(12) United States Patent
Shimojoh et al.

(10) Patent No.: US 6,268,955 B1
(45) Date of Patent: Jul. 31, 2001

(54) OPTICAL AMPLIFIER AND WAVE LENGTH DIVISION MULTIPLEXED LIGHT TRANSMISSION SYSTEM

(75) Inventors: Naomasa Shimojoh; Takao Naito, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/330,610

(22) Filed: Jun. 11, 1999

(30) Foreign Application Priority Data

Sep. 28, 1998 (JP) .................................................. 10-273557

(51) Int. Cl.$^7$ ...................................................... H01S 3/00
(52) U.S. Cl. ......................................... 359/337.2; 359/341
(58) Field of Search .................................... 359/341, 337, 359/124, 337.2, 341.1

(56) References Cited

U.S. PATENT DOCUMENTS 5,731,892 * 3/1998 DiGivanni et al. ................... 359/341
5,880,874 * 3/1999 Shibuya et al. ...................... 359/337

FOREIGN PATENT DOCUMENTS

97/0794599  9/1997 (EP) .

OTHER PUBLICATIONS

Ashish M. Vengsarkar et al., Long–Period Fiber Gratings as Band–Rejection Filters, Journal of Lightwave Technology, vol. 14, No. 1, Jan. 1996.

* cited by examiner

*Primary Examiner*—Mark Hellner
(74) *Attorney, Agent, or Firm*—Staas & Halsey LLP

(57) ABSTRACT

An object is to provide a low cost optical amplifier having a simple construction where gain equalization of wavelength division multiplexed signal light, and the suppression of noise light is realized by a single optical device, and to provide a wavelength division multiplexed light transmission system using such an amplifier. Accordingly, the optical amplifier of the present invention is constructed by providing for a conventional optical amplifier incorporating an EDF, an excitation light source and a multiplexer, an optical filter having a periodic loss-wavelength characteristic with respect to a gain wavelength characteristic of the EDF. The optical filter has the characteristic that a spacing (FSR) corresponding to one period of a loss-wavelength characteristic corresponds to a gain peak wavelength difference of the EDF, and a maximum loss wavelength approximately coincides with a gain peak wavelength on a long wavelength side of the EDF. With such an optical filter, gain equalization of the signal light positioned in the gain peak wavelength neighborhood on the long wavelength side can be effected, and noise light generated in the gain peak wavelength neighborhood on the short wavelength side can be suppressed.

11 Claims, 9 Drawing Sheets

OPTICAL AMPLIFIER AND WAVE LENGTH DIVISION MULTIPLEXED LIGHT TRANSMISSION SYSTEM

BACKGROUND OF THE INVENTION

1. Field of the Invention

The present invention relates to an optical amplifier for batch amplifying, wavelength division multiplexed signal light which includes a plurality of signal lights of different wavelengths, and to a wavelength division multiplexed light transmission system which transmits the wavelength division multiplexed signal light while amplifying and repeating. In particular the invention relates to an optical amplifier and a wavelength division multiplexed light transmission system which can effect gain equalization of wavelength division multiplexed signal light, and suppression of noise light.

2. Description of the Related Art

With conventional long distance optical transmission systems, optical transmission is performed using optical regeneration repeaters which electrically convert light signals to effect re-timing, re-shaping, and re-generating. However recently, with progress in the utilization of optical amplifiers, optical amplifier repeater transmission systems which use optical amplifiers as linear repeaters are being investigated. By replacing an optical regeneration repeater with an optical amplifier repeater, the number of parts in the repeater can be greatly reduced, with the prospect of maintaining reliability and greatly reducing costs.

Furthermore, as a method of realizing large capacity of an optical transmission system, a wavelength division multiplexed (WDM) light transmission systems which multiplexes and transmits a plurality of signal lights of different wavelengths on a single transmission path is attracting attention.

With a WDM optical amplifier repeater transmission system with a WDM light transmission system combined with an optical amplifier repeater transmission system, it is possible to batch amplify, signal light of various wavelengths using an optical amplifier, thus enabling the realization of large capacity and long distance transmission with a simple (economic) construction.

Presently, as a practical optical amplifier, there is for example the erbium doped optical fiber amplifier (referred to hereunder as EDFA). The basic construction of this, as shown in FIG. 10 comprises an erbium doped fiber 1 (referred to hereunder as an EDF 1), an excitation light source 2 for generating excitation light, and a multiplexer 3 for multiplexing light signals input to an input port IN with excitation light output from the excitation light source 2. The optical amplifier 100 of FIG. 10 has a forward excitation type construction with the propagation direction of both the signal light and the excitation light inside the EDF 1 in the same direction. As other basic constructions other than the forward excitation type there is the backward excitation type optical amplifier 100' as shown in FIG. 11, with the propagation directions of the signal light and the excitation light in opposite directions, and the bi-directional excitation type optical amplifier (not shown in the figure), with excitation light supplied from opposite ends of the EDF 1.

The gain-wavelength characteristic of an optical amplifier using such an erbium doped fiber is known to have two gain peaks as shown in FIG. 12. In FIG. 12 is shown one example of a gain-wavelength characteristic for when an EDFA is operated in a saturation region. With this gain-wavelength characteristic, the gain peak wavelength on the short wavelength side is in the vicinity of 1534 nm, while the gain peak wavelength on the long wavelength side is in the vicinity of 1558 nm. Moreover, with the wavelength bandwidth for where the gain-wavelength characteristic becomes comparatively flat (for example the 3 dB bandwidth or the 10 dB band width), that for the gain peak on the long wavelength side is wider than that for the gain peak on the short wavelength side. Therefore with a WDM optical amplifier repeater transmission system using an EDFA, it is common to position the wavelength division multiplexed signal light, with the gain peak wavelength neighborhood on the long wavelength side at the center.

Amplification of wavelength division multiplexed signal light is performed corresponding to a wavelength band where the optical amplifier gain-wavelength characteristic becomes comparatively flat as described above. However, in the case such as shown in FIG. 13 for example, where a plurality of optical amplifiers 100 are positioned between an optical transmitter Tx and an optical receiver Rx to perform multistage repeating, the gain differences for the signal lights of the respective wavelengths in the respective optical amplifiers 100 are accumulated. As a result, a large level difference is produced in the signal light of the respective wavelengths after multistage repeating, so that the optical receiver cannot normally receive the wavelength division multiplexed signal light.

Therefore, with conventional optical amplifiers, a gain equalizer for flattening the gain of the signal light of the respective wavelengths is provided to thereby prevent the above described accumulation of the gain differences. As an example, in the case where with an eight wave multiplexed light transmission system, being in a state of practical use, the channel spacing (wavelength spacing) of the wavelength division multiplexed signal light is 0.8 nm, then 5.6 nm is required for the signal light wavelength bandwidth. With this signal light wavelength band, it is known that even with transmissions of for example 10,000 km, gain equalization can be realized comparatively easily using just one type of gain equalizer (optical filter). Further, the channel spacing of 0.8 nm corresponds to a frequency spacing of 100 GHz in the 1.55 $\mu$m band. This is the ITU international standard.

Moreover, with the conventional optical amplifier, it is common to provide, separate to the abovementioned gain equalizer, an optical filter dedicated to suppressing noise light (spontaneous emission light noise) in the gain peak wavelength neighborhood on the short wavelength side. That is, since the gain peak on the short wavelength side outside the band of the wavelength division multiplexed signal light generates an excess of noise light, then the optical SN ratio of the wavelength division multiplexed signal light deteriorates. The abovementioned optical filter is for preventing deterioration in the optical SN ratio by suppressing this excess of noise light.

However, with the abovementioned conventional optical amplifier, since the two optical devices, namely the gain equalizer and the filter for suppressing noise light are provided separately, there is the problem that the overall construction of the optical amplifier becomes complicated, and the need also arises for compensating for insertion loss and polarization dependence loss generated by each of the two optical devices, so that there is an increase in the cost of the optical amplifier.

In particular, in realizing a WDM optical amplifier repeater transmission system aimed at even greater capacity transmission, the abovementioned gain equalization of the wavelength division multiplexed signal light and noise light suppression become important.

For example, considering the case of a sixteen-channel WDM light transmission system, when the channel width is made 0.8 nm, then 12 nm becomes necessary for the signal light wavelength bandwidth of the optical amplifier. To realize an optical amplifier having such a wide signal light wavelength band width, then in the gain peak wavelength neighborhood on the long wavelength side, the wavelength bandwidth where the gain-wavelength characteristic becomes flat must be widened. For this, there is known a method where for example as shown in FIG. 14, the optical input power to the optical amplifier is reduced so that the optical amplifier is operated in the unsaturated region. FIG. 15 shows an example of the gain-wavelength characteristic for when an EDFA is operated in the unsaturated region.

When as in FIG. 15, the EDFA is used in the unsaturated region, the bandwidth of the gain flattened part in the gain peak wavelength neighborhood on the long wavelength side becomes wide. However, the gain in the gain peak wavelength neighborhood on the short wavelength side increases, and hence an excess of noise light is further generated. Therefore, compared to the case where the EDFA is operated in the saturated region, there is the likelihood of a significant degradation of the optical SN ratio of the wavelength division multiplexed signal light. Consequently, the requirement for gain equalization of the wavelength division multiplexed signal light, and for noise light suppression is increased.

SUMMARY OF THE INVENTION

The present invention takes into consideration the above problems, with the object of providing a low cost optical amplifier having a simple construction where gain equalization of the wavelength division multiplexed signal light, and the suppression of the noise light are realized by a single optical device, and of providing a wavelength division multiplexed light transmission system using such an amplifier.

Accordingly, with the optical amplifier of the present invention for batch amplifying wavelength division multiplexed signal light which includes a plurality of signal lights of different wavelengths, which comprises; a rare-earth element doped fiber doped with a rare-earth element, an excitation light source for generating excitation light for exciting the rare-earth element doped fiber, and a multiplexing section which inputs the excitation light generated by the excitation light source to the rare-earth element doped fiber, there is provided an optical filter which has a loss-wavelength characteristic that periodically changes at a predetermined spectral spacing based on a wavelength difference between adjacent gain peaks in a gain-wavelength characteristic of the rare-earth element doped fiber, with a maximum loss wavelength in the loss-wavelength characteristic being approximately coincident with one of the gain peak wavelengths where the plurality of signal lights of different wavelengths are positioned.

With such a construction, the excitation light generated by the excitation light source is supplied to the rare-earth element doped fiber via the multiplexing section, thereby exciting the rare-earth element doped fiber. When a wavelength division multiplexed signal light is input to the rare-earth element doped fiber, the wavelength division multiplexed signal light is amplified in accordance with the gain-wavelength characteristic of the rare-earth element doped fiber. Since the gain-wavelength characteristic has for example two gain peaks, a gain deviation occurs between the respective signal lights corresponding to one of the gain peaks where the signal lights of respective wavelengths are positioned. Moreover, noise light is generated corresponding to the other gain peak. However, by transmitting wavelength division multiplexed signal light to an optical filter having a periodic loss-wavelength characteristic, then flattening of the gain deviation and suppression of the noise light are performed simultaneously, so that wavelength division multiplexed signal light with a high optical SN ratio and the signal light gain made uniform is obtained.

Consequently, since gain equalization and noise light suppression are realized by a single optical fiber, the construction of the optical amplifier can be simplified and the cost reduced. Furthermore, insertion loss by providing an optical device and polarization dependence loss can be reduced, enabling realization of excellent amplifying characteristics.

Moreover, for the specific arrangement of the optical filter, this may be pre-stage of a signal light input end of the rare-earth element doped fiber, or may be post-stage of a signal light output end of the rare-earth element doped fiber.

If the optical filter is provided at the pre-stage of the signal light input end of the rare-earth element doped fiber, the optical amplifier has a high output characteristic, while if the optical filter is provided at the post-stage of the signal light output end of the rare-earth element doped fiber, the optical amplifier has an excellent noise characteristic.

Furthermore, as a specific example of the optical filter, one of a Mach-Zehnder type filter, an etalon filter, or a long period fiber grating filter may be used.

With the above described optical amplifier, preferably the wavelength division multiplexed signal light is such that the plurality of signal lights of different wavelengths are included within a wavelength band corresponding to approximately ½ of the predetermined spectral spacing. By stipulating this, then the gain equalization by the optical filter of the signal lights of respective wavelengths can be more reliably effected.

Furthermore, as the rare-earth element doped fiber, an erbium doped fiber which has been doped with erbium may be used.

As a construction for the case where an erbium doped fiber is used, then with the optical filter, preferably the predetermined spectral spacing is set to a value centered on 24 nm and the maximum loss wavelength is set to a value centered on 1558 nm, and the wavelength division multiplexed signal light includes signal light of sixteen waves with a wavelength spacing of 0.8 nm.

Furthermore, with the wavelength division multiplexed signal light, this may include signal light of eight waves with a wavelength spacing of 1.6 nm.

Alternatively, with the optical filter, the predetermined spectral spacing may be set to a value centered on 12 nm and the maximum loss wavelength may be set to a value centered on 1558 nm, and the wavelength division multiplexed signal light may include signal light of eight waves with a wavelength spacing of 0.8 nm.

Moreover, with the wavelength division multiplexed light transmission system of the present invention comprising; a light transmitting device for transmitting wavelength division multiplexed signal light which includes a plurality of signal lights of different wavelengths to an optical transmission path, a plurality of optical amplifiers for batch amplifying wavelength division multiplexed signal light propagating along the optical transmission path, and a light receiving device for receiving wavelength division multiplexed signal light transmitted via the transmission path, at least one optical amplifier of the plurality of optical amplifiers comprises; a rare-earth element doped fiber doped with a rare-earth element, an excitation light source for generating excitation light for exciting the rare-earth element doped fiber, a multiplexing section which inputs the excitation light generated by the excitation light source to the rare-earth element doped fiber, and an optical filter which has a loss-wavelength characteristic that periodically changes at a predetermined spectral spacing based on a wavelength difference between adjacent gain peaks in a gain-wavelength characteristic of the rare-earth element doped fiber, with a maximum loss wavelength in the loss-wavelength characteristic being approximately coincident with one of the gain peak wavelengths where the plurality of signal lights of different wavelengths are positioned.

With a wavelength division multiplexed light transmission system of such construction, the wavelength division multiplexed signal light transmitted from the light transmitting device is transmitted to the light receiving device while being amplified in the respective optical amplifiers. With this amplifying and repeating transmission of the wavelength division multiplexed signal light, at least one of the plurality of optical amplifiers incorporates an optical filter having a periodic loss-wavelength characteristic, and hence gain equalization and noise light suppression of the signal light is effected by this optical filter. As a result, a wavelength division multiplexed light transmission system with excellent transmission characteristics can be realized at a low cost.

Other objects, characteristics, and advantages of the present invention will become apparent from the following description of embodiments given in conjunction with the appended drawings.

DETAILED DESCRIPTION OF THE INVENTION

As follows is a description of embodiments of the present invention with reference to the drawings.

Figure 1:
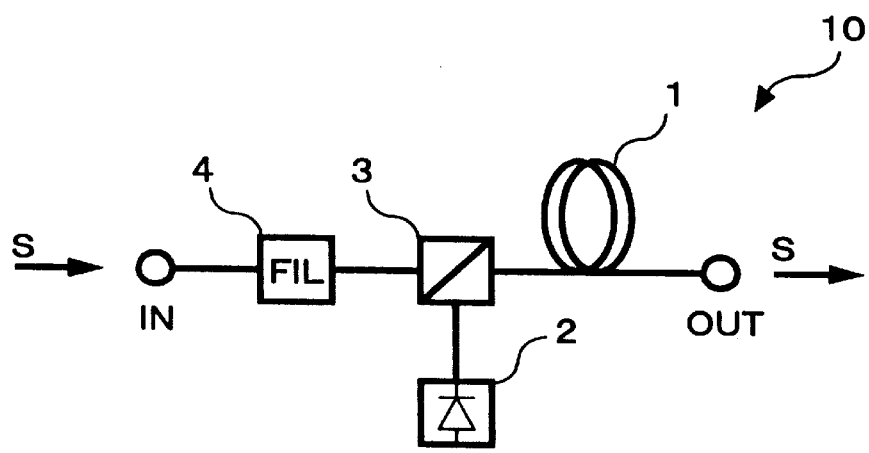
FIG. 1 is a block diagram showing the construction of an optical amplifier according to a first embodiment of the present invention.

FIG. 1 is a block diagram showing the construction of an optical amplifier according to a first embodiment of the present invention. Parts the same as for the construction of the abovementioned conventional optical amplifier are denoted by the same symbols, the same applying for the other figures.

In FIG. 1, an optical amplifier 10 of the embodiment is one where, for example in a conventional forward excitation type optical amplifier, an optical filter (FIL) 4 having a periodic loss-wavelength characteristic is provided on the side for inputting a wavelength division multiplexed signal light S. More specifically, this comprises an EDF 1 serving as a rare-earth element doped fiber, an excitation light source 2 for generating excitation light, a multiplexer 3 serving as a multiplexing section which supplies excitation light output from the excitation light source 2, from the signal light input end side of the EDF 1, and an optical filter 4 inserted between the multiplexer 3 and an input port IN. Here the description is for the case where wavelength division multiplexed signal light S which includes for example sixteen wave signal light in a wavelength band centered on 1558 nm is amplified by the abovementioned optical amplifier 10.

Figure 2:
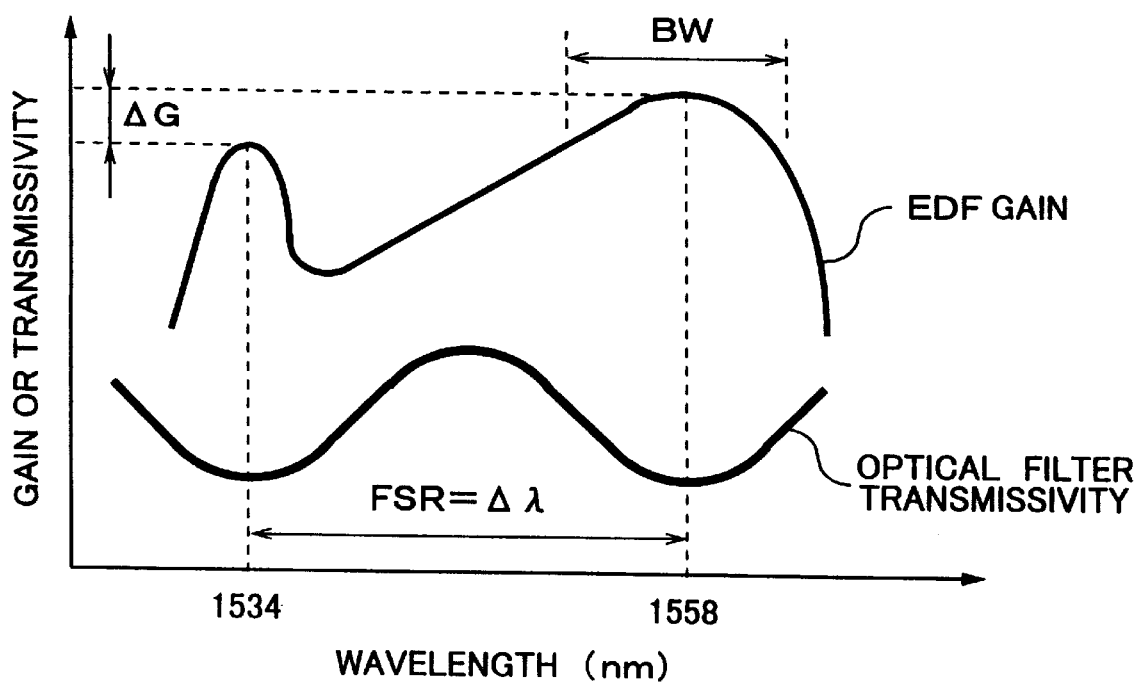
FIG. 2 is a diagram showing a loss-wavelength characteristic and an EDF gain-wavelength characteristics of an optical filter of the first embodiment.

The optical filter 4 has the characteristic for example as shown by the thick line at the bottom of FIG. 2, that the spacing (free-spectral-range, referred to hereunder as FSR) corresponding to one period of the loss-wavelength characteristic corresponds to a difference $\Delta\lambda$ between the gain peak wavelength on the long wavelength side and the gain peak wavelength on the short wavelength side of the EDF 1, and the maximum loss wavelength approximately coincides with the gain peak wavelength on the long wavelength side of the EDF 1. In the figure, the loss-wavelength characteristic of the optical filter 4 is shown by the relative transmissivity. For the specific settings for this optical filter 4, the maximum loss wavelength is preferably set to 1558 nm±3 nm, and the FSR to 24 nm±4 nm.

The value of the FSR of the optical filter 4 must be set corresponding to the operating conditions of the optical amplifier 10. This is because the gain peak wavelength difference $\Delta\lambda$ of the EDF 1 changes with the operating conditions of the optical amplifier 10.

Figure 3:
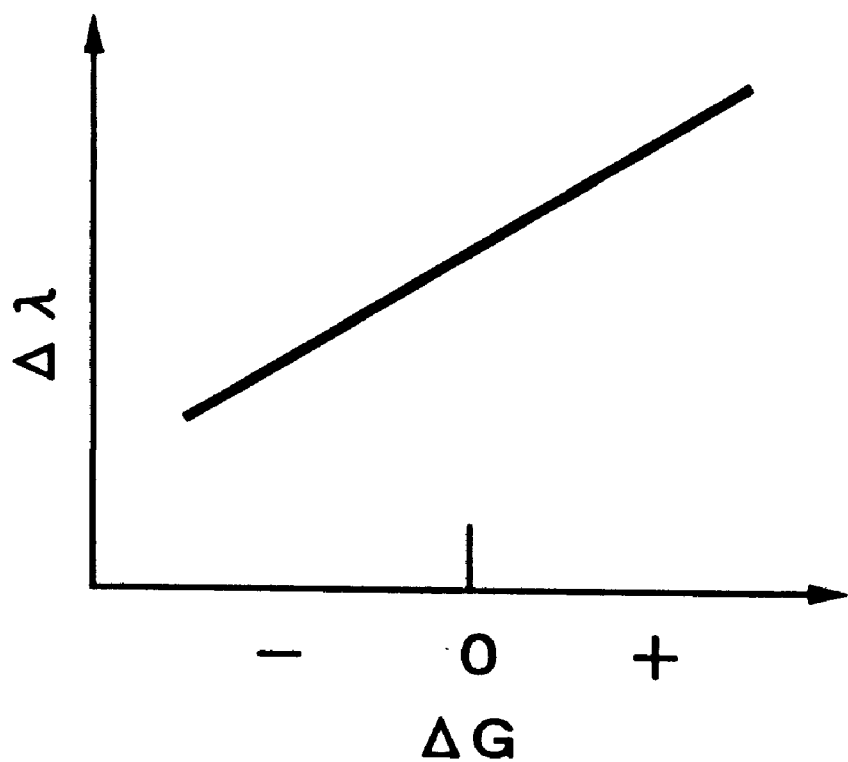
FIG. 3 is a diagram for explaining a change in a gain peak wavelength difference due to operating conditions of the optical amplifier in the first embodiment.
Figure 12:
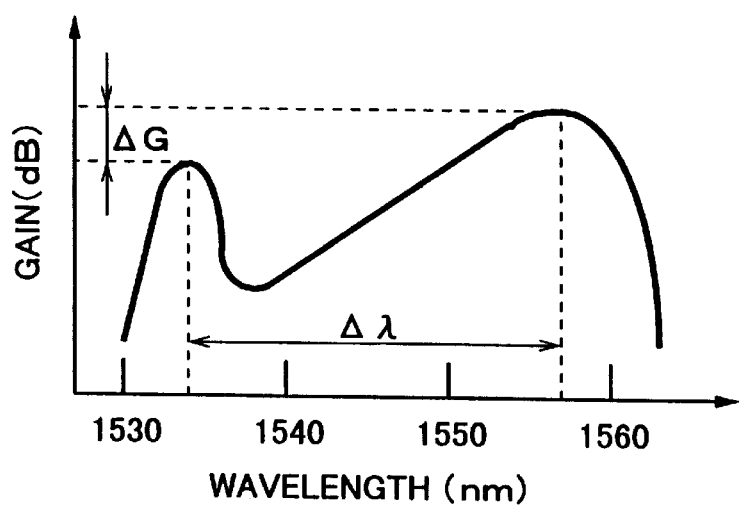
FIG. 12 is a diagram showing an example of a gain-wavelength characteristic in a saturation region of an erbium doped fiber amplifier.
Figure 13:
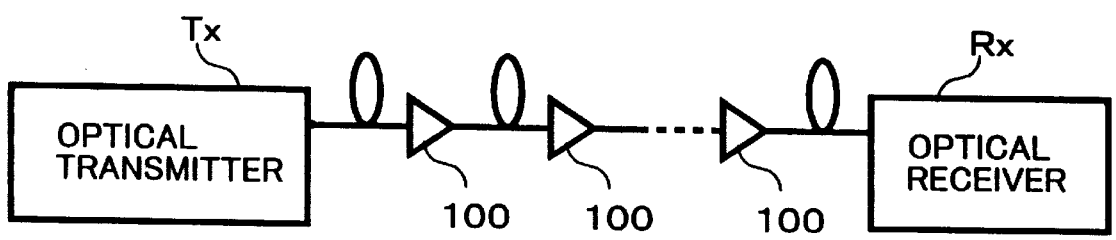
FIG. 13 is a block diagram showing the construction of a conventional wavelength division multiplexed light transmission system.
Figure 14:
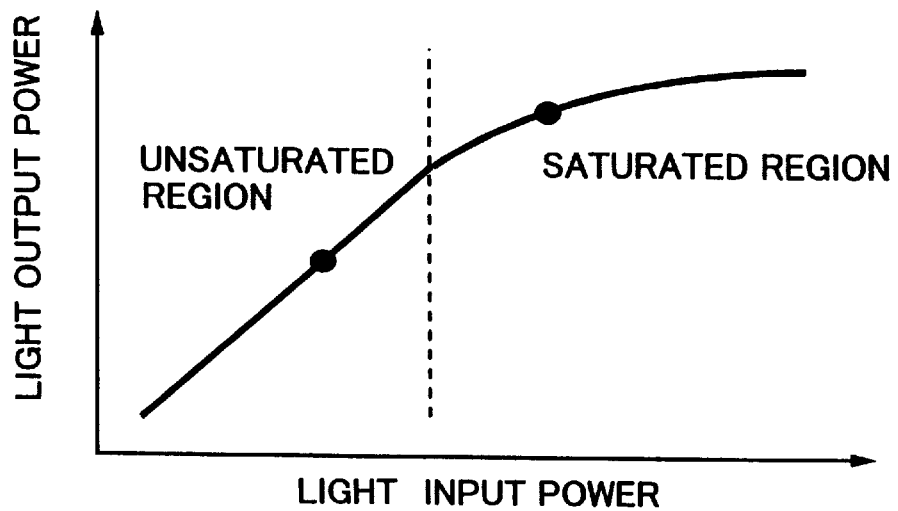
FIG. 14 is a diagram showing operating conditions of an optical amplifier.
Figure 15:
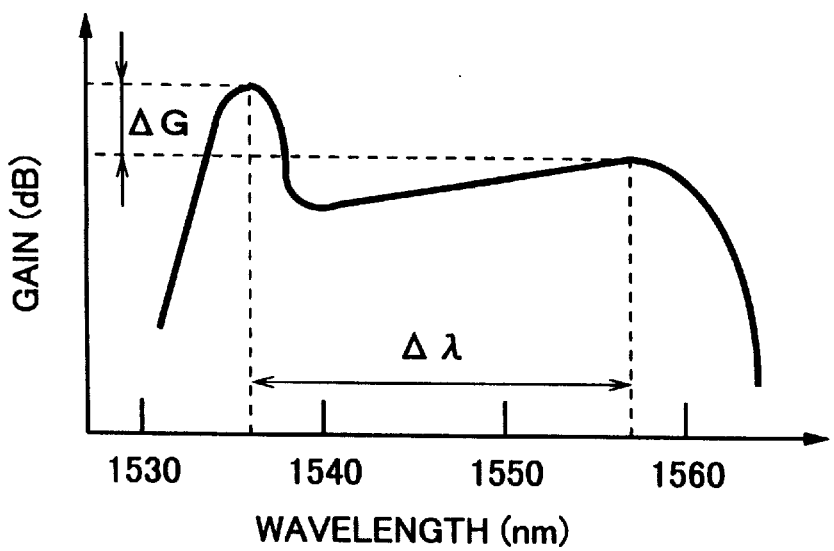
FIG. 15 is a diagram showing an example of gain-wavelength characteristic in an unsaturated region of an erbium doped fiber amplifier.

FIG. 3 gives an example showing the change of the gain peak wavelength difference $\Delta\lambda$ with the operating conditions of the optical amplifier 10. FIG. 3 shows the relationship of the gain peak wavelength difference $\Delta\lambda$ with respect to a gain difference $\Delta G$ (refer to FIG. 2) between the gain peak on the long wavelength side, and the gain peak on the short wavelength side. The value of the difference ΔG of the gain peaks, as can also be seen by comparison with the above-mentioned FIG. 12 and FIG. 15, changes corresponding to the operating conditions of the optical amplifier. Consequently it can be seen from the relation of FIG. 3 that the gain peak wavelength difference Δλ changes with the operating conditions of the optical amplifier 10.

Furthermore, the abovementioned setting is such that the gain peak wavelength on the short wavelength side of the EDF 1 and the wavelength where the transmissivity of the optical filter 4 becomes a minimum, approximately coincide. However, since the characteristic of the optical filter 4 in the gain peak wavelength neighborhood on the short wavelength side is such that the effect of suppressing the noise light is produced if the light in this wavelength band is attenuated, then it does not matter if the wavelength where the transmissivity is a minimum deviates slightly.

Moreover, it is suitable to have the wavelength bandwidth BW (refer to FIG. 2) of the wavelength division multiplexed signal light S for reliably executing gain equalization with the optical filter 4, approximately ½ of the FSR of the optical filter 4. Consequently with the setting for the optical filter 4, the desirable wavelength bandwidth BW for the wavelength division multiplexed signal light S becomes 12 nm±2 nm. Here, assuming a sixteen-channel wavelength division multiplexed signal light S, if the channel spacing corresponding to the ITU international standard is 0.8 nm, then the wavelength bandwidth BW becomes 12 nm. Hence in this case, the setting for the optical filter 4 is said to be optimal.

As a specific example of the optical filter 4 having a periodic loss-wavelength characteristic as described above, this can be for example a known optical device such as a Mach-Zehnder type filter or an etalon filter, or a long period fiber grating filter. The long period fiber grating filter is proposed for example by Ashish M. Vengsarkar et al, "Long-Period Fiber Gratings as Band-Rejection Filters," Journal of Lightwave Technology, Vol. 14, No. 1, January 1996. Here, an outline of a Mach-Zehnder type filter is shown in FIG. 4.

Figure 4:
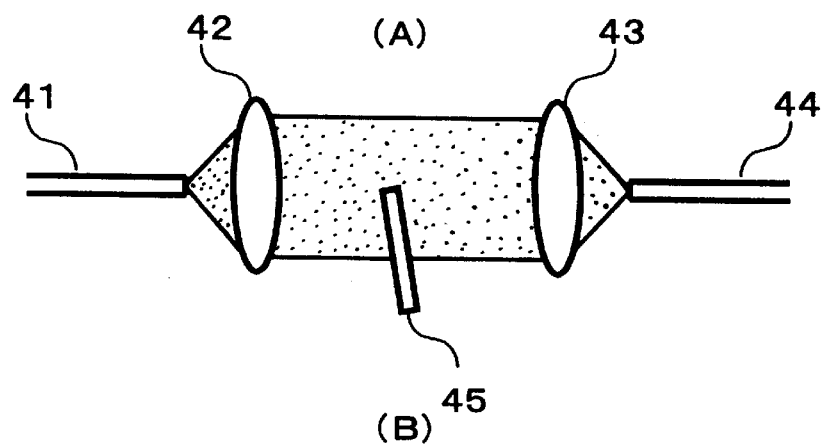
FIG. 4 is a diagram showing an outline of a Mach-Zehnder type filter used in the first embodiment.
Figure 4:
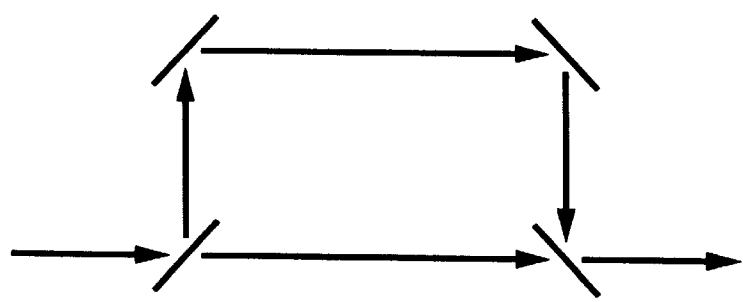

As shown in FIG. 4 (A), with the Mach-Zehnder type filter, signal light output from one end of an input side optical fiber 41 is made into a parallel beam using a lens 42. This parallel beam is then converged by a lens 43 positioned at a predetermined spacing from the lens 42, and input to an output side optical fiber 44. A glass plate 45 of predetermined thickness is inserted between the lenses 42 and 43, inclined at a predetermined angle to the parallel beam. With this arrangement, a Mach-Zehnder interferometer such as shown in the equivalent circuit of FIG. 4 (B) is constructed, giving an optical filter having a periodic loss-wavelength characteristic. In this case, the FSR of the Mach-Zehnder type filter is determined by the thickness of the glass plate 45. Moreover, the depth of the loss (maximum loss amount) which changes periodically is determined by the insertion amount of the glass plate 45. This is equivalent to changing the branching ratio of the Mach-Zehnder interferometer. Furthermore, the maximum loss wavelength is changed by inclining the glass plate 45. This corresponds to slightly changing the delay amount.

Next is a description of the operation of the first embodiment.

When the optical amplifier 10 is activated, the excitation light generated by the excitation light source 2 is supplied to the EDF 1 via the multiplexer 3 so that the EDF 1 attains an excited state. Then, when the wavelength division multiplexed signal light S is input from the outside to the input port IN of the optical amplifier 10, the wavelength division multiplexed signal light S is transmitted to the optical filter 4.

In the optical filter 4, light components (signal lights) in the gain peak wavelength neighborhood on the long wavelength side are attenuated by a predetermined amount so that in the input wavelength division multiplexed signal light S, the gain deviation between the signal lights of the respective wavelengths produced by the post-stage EDF 1 are compensated for beforehand. Moreover, the optical components (noise light) in the gain peak wavelength neighborhood on the short wavelength side are attenuated so that the noise light is not amplified by the post-stage EDF 1.

The wavelength division multiplexed signal light S which has passed through the optical filter 4 is input to the EDF 1 via the multiplexer 3, amplified by the induced emission effect of the EDF 1, and then output to the outside from the output port OUT. With the wavelength division multiplexed signal light S output from the output port OUT, the respective gains of the sixteen-channel signal lights are approximately equal, giving a signal with a high optical SN ratio with the noise light in the gain peak wavelength neighborhood on the short wavelength side suppressed.

In this way with the first embodiment, by providing on the signal light input side, an optical filter 4 having a periodic loss-wavelength characteristic corresponding to the gain-wavelength characteristic of the EDF 1, then the flattening of the signal light gain (gain equalization) in the gain peak wavelength neighborhood on the long wavelength side, and the suppression of the noise light in the gain peak wavelength neighborhood on the short wavelength side can be realized with a single optical device. As a result, there is no longer the requirement as with the conventional optical amplifier of providing two optical devices separately, one as a gain equalizer and one as a noise light suppression optical filter. Therefore the construction of the optical amplifier can be simplified and a reduction in cost realized. Moreover, insertion loss and the polarization dependence loss by providing an optical device can be reduced, enabling the provision of an optical amplifier with excellent amplifying characteristics.

Further with the first embodiment as described above, the description has been for the case where amplification of wavelength division multiplexed signal light which includes signal light of sixteen waves (channels) is performed with a channel spacing of 0.8 nm in a wavelength band centered on 1558 nm. However the setting of the wavelength division multiplexed signal light of the present invention is not limited to this. For example, this may be for a wavelength division multiplexed signal light which includes signal light of eight waves (channels) with a channel spacing of 1.6 nm.

Furthermore, the FSR was set to 24 nm±4 nm so that the spacing corresponding to one period portion of the loss-wavelength characteristic of the optical filter 4 approximately coincides with the gain peak wavelength difference Δλ of the EDF 1. However, the FSR may instead be set for example to 12 nm±4 nm so that the gain peak wavelength difference Δλ and the spacing for a two period portion of the loss-wavelength characteristic approximately coincide. Since it is suitable to have a signal light wavelength bandwidth BW in this case of 6 nm±2 nm, then for the wavelength division multiplexed signal light, this is preferably set to include for example signal light of eight waves (channels) with a channel spacing of 0.8 nm.

Figure 5:
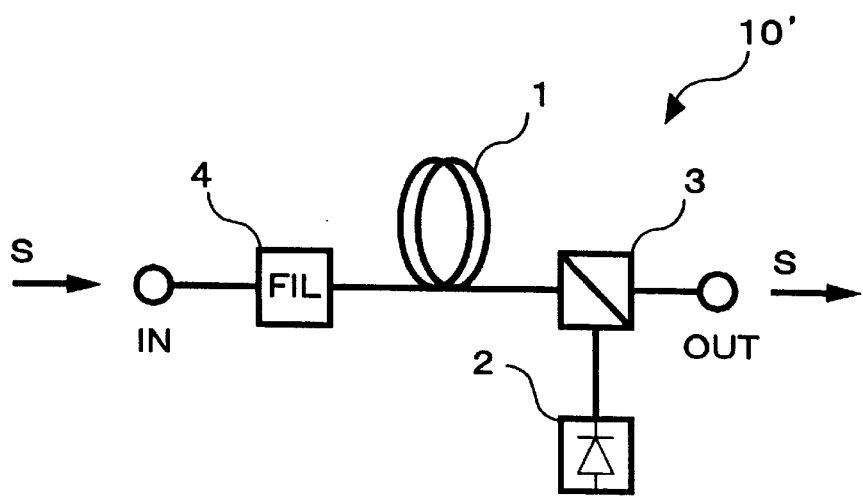
FIG. 5 is a block diagram showing a structural example for a case where the first embodiment is a backward excitation type.

Furthermore, the description has been for the case where the optical filter 4 is provided in a forward excitation type optical amplifier. However, the present invention may also be applied to a backward excitation type optical amplifier or a bi-directional excitation type optical amplifier, in the same manner as for the case of the forward excitation type. In FIG. 5 a construction example is shown for when the present invention is applied to a backward excitation type optical amplifier. With the optical amplifier 10' of FIG. 5, an optical filter 4 having a loss-wavelength characteristic is inserted between an input port IN and a signal light input end of an EDF 1, to thereby obtain the same function and effect as for the case of the first embodiment.

Next is a description of a second embodiment of the present invention.

Figure 6:
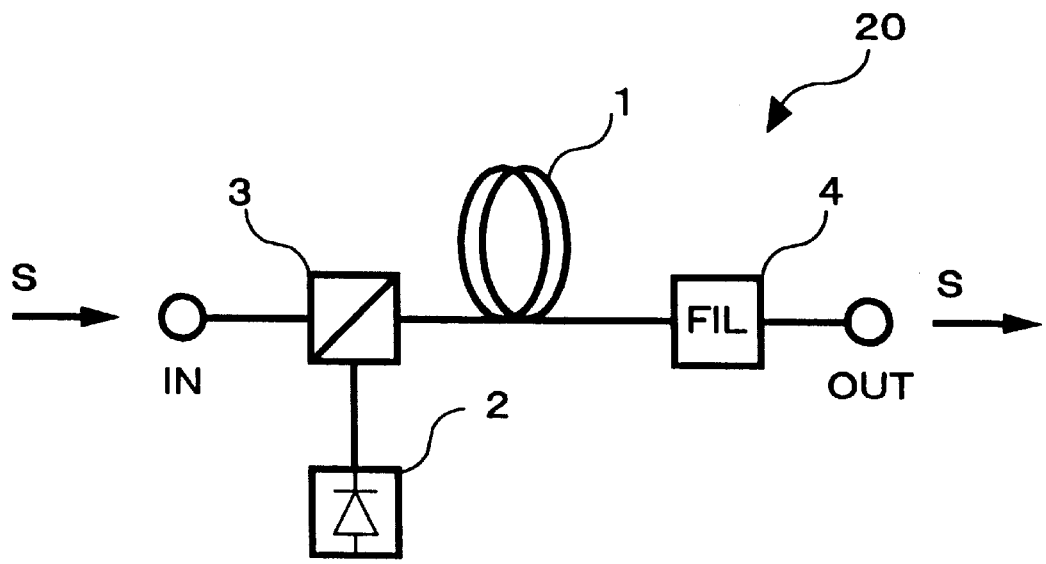
FIG. 6 is a block diagram showing the construction of an optical amplifier according to a second embodiment of the present invention.

FIG. 6 is a block diagram showing the construction of an optical amplifier according to the second embodiment.

In FIG. 6, an optical amplifier 20 of the invention is one where, in a forward excitation type optical amplifier which incorporates for example an EDF 1, an excitation light source 2, and a multiplexer 3, an optical filter 4 having a periodic loss-wavelength characteristic is provided on the side for outputting a wavelength division multiplexed signal light S. The optical filter 4 is the same as the filter used in the first embodiment, and is here positioned between the signal light output terminal of the EDF 1, and the output port OUT.

With such an optical amplifier 20, then when as with the operation for the case of the first embodiment, the wavelength division multiplexed signal light S is input from the outside to the input port IN of the optical amplifier 20 which is in the excited state, the wavelength division multiplexed signal light S is transmitted via the multiplexer 3 to the EDF 1 and amplified, and is then transmitted from the EDF 1 to the optical filter 4. The wavelength division multiplexed signal light S output from the EDF 1, is one where a deviation occurs in the gain of the signal light of the respective wavelengths corresponding to the gain peak on the long wavelength side of the EDF 1, and which includes a noise light component amplified in the gain peak wavelength neighborhood on the short wavelength side. By inputting this wavelength division multiplexed signal light S into the optical filter 4, then the gain deviation of the signal light of the respective wavelengths is flattened, and the noise light in the gain peak wavelength neighborhood on the short wavelength side is suppressed. The wavelength division multiplexed signal light S which has passed through the optical filter 4 is then output to the outside via the output port OUT.

Consequently with the second embodiment, even though the optical filter 4 having the periodic loss-wavelength characteristic corresponding to the gain-wavelength characteristic of the EDF 1 is provided on the signal light output side, the same effect as for the case of the first embodiment can be obtained. Moreover, by providing the optical filter 4 on the signal light output side on the post-stage of the EDF 1, gives an optical amplifier with noise characteristics superior to the case of the first embodiment. That is to say, with the first embodiment, since the wavelength division multiplexed signal light S at a low level prior to being amplified by the EDF I is input to the optical filter 4, then the loss in the optical filter 4 has an influence on the noise characteristics. On the other hand, in the case of the second embodiment, since the wavelength division multiplexed signal light S which has been sufficiently amplified by the EDF 1 is input to the optical filter 4, then the influence of losses in the optical filter 4 is reduced, giving excellent noise characteristics. However, in the case of the second embodiment, since with the wavelength division multiplexed signal light S which has been amplified by the EDF 1 a loss occurs in the optical filter 4, then the output level of the wavelength division multiplexed signal light S occasionally becomes lower than for the case of the first embodiment. Consequently, it is desirable to appropriately select the first or the second embodiment corresponding to the priority given to either of the noise characteristics or the high output characteristics.

Figure 7:
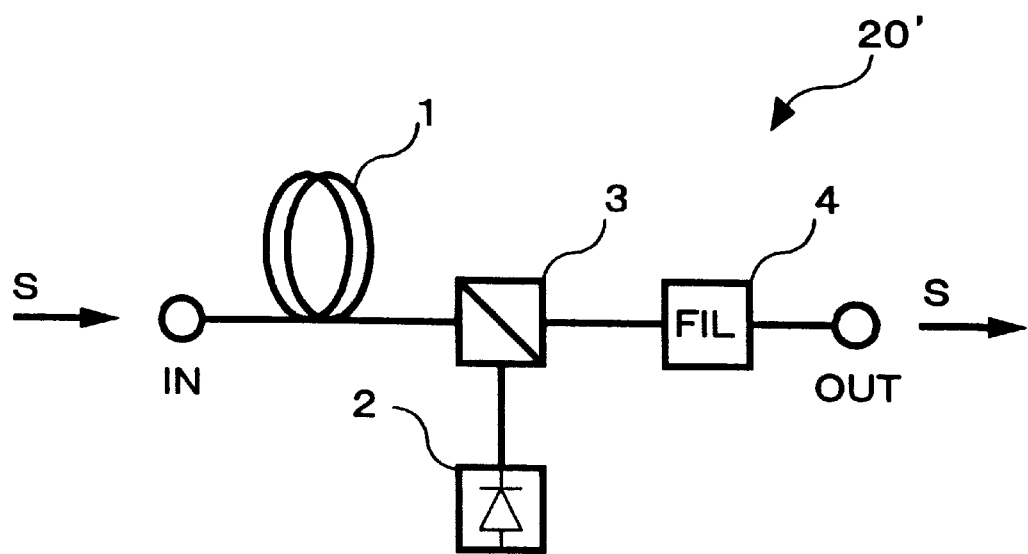
FIG. 7 is a block diagram showing a structural example for a case where the second embodiment is a backward excitation type.

Further, with the above described second embodiment, the description has been for the case where the optical filter 4 is provided in a forward excitation type optical amplifier. However, the present invention may also be applied to a backward excitation type or a bidirectional excitation type optical amplifier. In FIG. 7 a construction example is shown for when the present invention is applied to a backward excitation type optical amplifier. With the optical amplifier 20' of FIG. 7, an optical filter 4 is inserted between a multiplexer 3 and an output port OUT, to thereby obtain the same function and effect as for the case of the second embodiment.

Next is a description of a third embodiment of the present invention.

Figure 8:
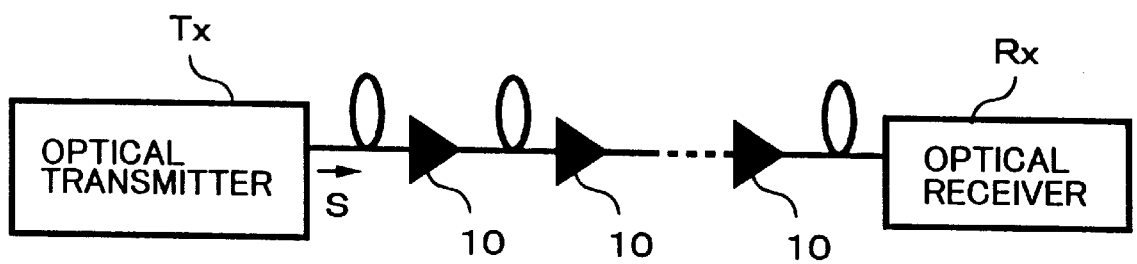
FIG. 8 is a block diagram showing the construction of a wavelength division multiplexed light transmission system according to a third embodiment of the present invention.

FIG. 8 is a block diagram showing the construction of a wavelength division multiplexed light transmission system according to the third embodiment.

In FIG. 8, the wavelength division multiplexed light transmission system is constructed with for example the optical amplifiers 10 of the first embodiment severally connected as repeaters between an optical transmitter Tx serving as an optical transmission device and an optical receiver Rx serving as an optical receiving device. The optical transmitter Tx and the optical receiver Rx are the same as those used in the conventional wavelength division multiplexed light transmission system.

With such a wavelength division multiplexed light transmission system, the wavelength division multiplexed signal light S transmitted from the optical transmitter Tx is transmitted to the optical receiver Rx while being successively amplified by the respective optical amplifiers 10 provided with optical filters 4 which have a periodic loss-wavelength characteristic. With the respective optical amplifiers 10, the gain equalization and the noise light suppression of the signal light is effected by the optical filter 4, and hence wavelength division multiplexed signal light S with a high optical SN ratio and the levels of the signal lights of the respective wavelengths uniform is transmitted to the optical receiver Rx from the optical transmitter Tx.

Consequently with the third embodiment, by respectively using the optical amplifiers 10 provided with the optical filters 4, as respective repeaters of the wavelength division multiplexed light transmission system, then a wavelength division multiplexed light transmission system with excellent transmission characteristics can be realized at low cost.

Next is a description of a fourth embodiment of the present invention.

Figure 9:
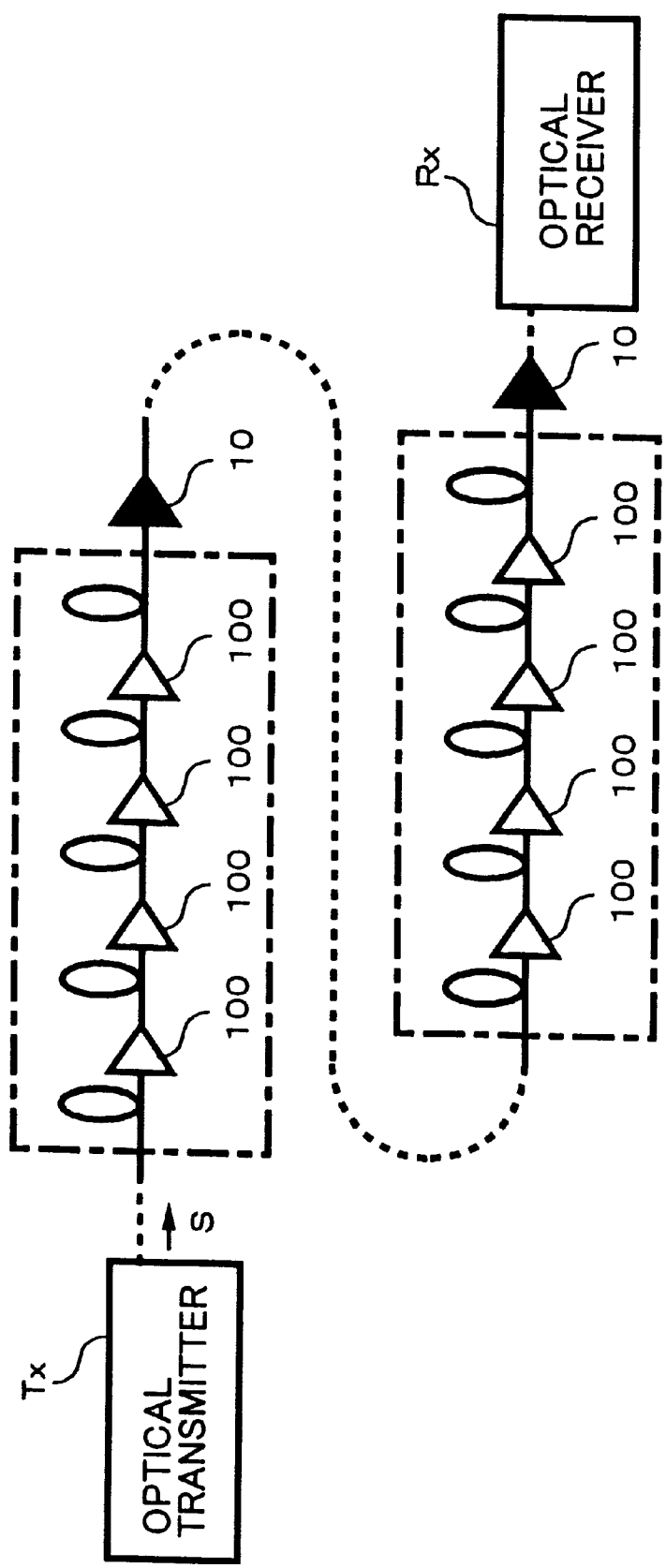
FIG. 9 is a block diagram showing the construction of a wavelength division multiplexed light transmission system according to a fourth embodiment of the present invention.
Figure 10:
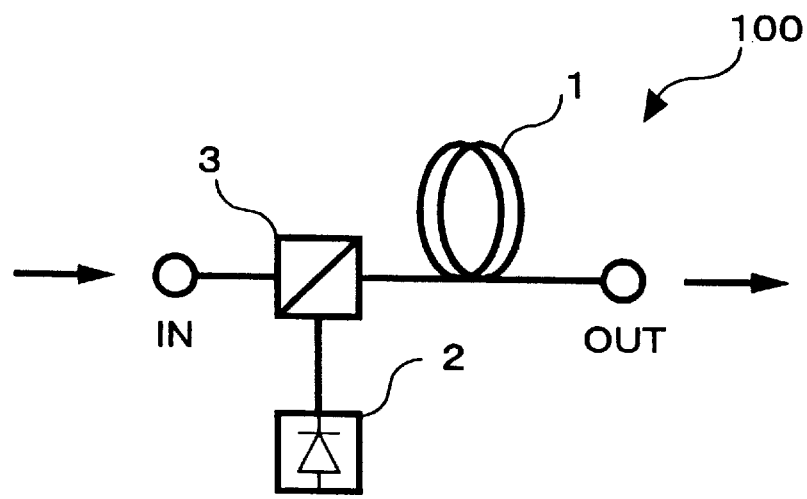
FIG. 10 is a block diagram showing the construction of a conventional forward excitation type optical amplifier.
Figure 11:
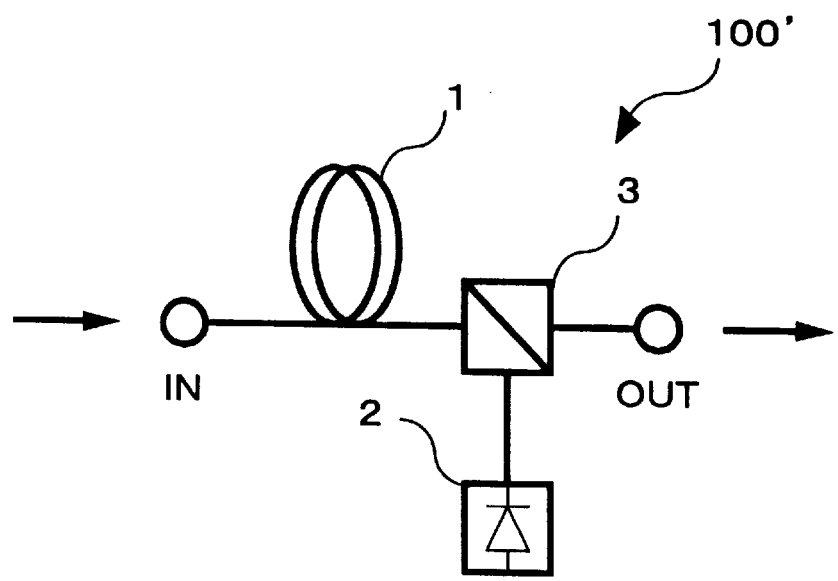
FIG. 11 is a block diagram showing the construction of a conventional backward excitation type optical amplifier.

FIG. 9 is a block diagram showing the construction of a wavelength division multiplexed light transmission system according to the fourth embodiment.

In FIG. 9, with the wavelength division multiplexed light transmission system, the construction is such that with a plurality of repeater sections between an optical transmitter Tx and an optical receiver Rx, an optical amplifier 10 of the abovementioned first embodiment is provided for each repeater section shown by the chain line in the figure and made up for example of four repeaters. The four repeaters in the repeater sections are conventional optical amplifiers 100 which are not provided with a gain equalizer or an optical filter for noise light suppression. The optical filters 4 of the optical amplifiers 10 provided for each of the respective repeater sections, flatten out the gain deviations of the accumulated signal light generated by the preceding repeater section. Furthermore, these have a loss-wavelength characteristic which suppresses the accumulated noise light generated by the preceding repeater section.

With such a wavelength division multiplexed light transmission system, the wavelength division multiplexed signal light S transmitted from the optical transmitter Tx is successively amplified by the four optical amplifiers 100, so that the gain deviation and the noise light of the signal light generated by the respective optical amplifiers 100 is accumulated. Then, by inputting the wavelength division multiplexed signal light S which includes the gain deviation and noise light into the optical amplifier 10, gain equalization and noise light suppression for the signal light is effected by the optical filter 4. Then after amplification, this is transmitted to the succeeding repeater section. The wavelength division multiplexed signal light S is thus transmitted to the optical receiver Rx, while the above operation is repeated for each of the respective repeater sections.

With the fourth embodiment, an optical amplifier 10 incorporating an optical filter 4 is provided for each of the repeater sections comprising a plurality of repeaters, and the gain deviation and noise light generated and accumulated in the repeater sections is subjected to gain equalization and noise light suppression in a block in a single optical amplifier 10. Hence a low cost wavelength division multiplexed light transmission system can be realized with an even simpler construction.

With the abovementioned fourth embodiment, the construction is such that one optical amplifier 10 incorporating an optical filter 4 is provided for each of the four optical amplifiers 100. However the arrangement of the optical amplifiers 10 is not limited to this, and the optical amplifiers 10 may be positioned as required at a suitable spacing.

Furthermore, with the abovementioned third and fourth embodiments, the description has been for the case where the optical amplifier 10 of the first embodiment is provided between the optical transmitter Tx and the optical receiver Rx. However instead of this optical amplifier 10, the optical amplifier 10' shown in FIG. 5, the optical amplifier 20 of the second embodiment, the optical amplifier 20' shown in FIG. 7, or the like, may be provided.

Moreover, with the first through fourth embodiments, the description has been for an optical amplifier using an EDF 1. However, the present invention is not limited to this, and the construction may involve an optical amplifier which uses a known rare-earth element doped fiber doped with a rare-earth element other than erbium. In this case, the maximum loss wavelength and the FSR of the optical filter 4 is set corresponding to the gain-wavelength characteristic of the rare-earth element doped fiber being used.

What we claimed are:

1. An optical amplifier for batch amplifying wavelength division multiplexed signal light which includes a plurality of signal lights of different wavelengths, which comprises;
    a rare-earth element doped fiber doped with a rare-earth element, an excitation light source for generating excitation light for exciting said rare-earth element doped fiber, and
    a multiplexing section which inputs the excitation light generated by the excitation light source to said rare-earth element doped fiber, wherein there is provided an optical filter which has a loss-wavelength characteristic that periodically changes at a predetermined spectral spacing based on a wavelength difference between adjacent gain peaks in a gain-wavelength characteristic of said rare-earth element doped fiber, with a maximum loss wavelength in said loss-wavelength characteristic being approximately coincident with one of the gain peak wavelengths where said plurality of signal lights of different wavelengths are positioned and the other of said adjacent gain peaks corresponds to a wavelength band in which noise light is generated.

2. An optical amplifier according to claim 1, wherein said optical filter is provided at a pre-stage of a signal light input end of said rare-earth element doped fiber.

3. An optical amplifier according to claim 1, wherein said optical filter is provided at a post-stage of a signal light output end of said rare-earth element doped fiber.

4. An optical amplifier according to claim 1, wherein said optical filter is one of a Mach-Zehnder type filter, an etalon filter, and a long period fiber grating filter.

5. An optical amplifier according to claim 1, wherein said wavelength division multiplexed signal light is such that said plurality of signal lights of different wavelengths are included within a wavelength band corresponding to approximately ½ of said predetermined spectral spacing.

6. An optical amplifier according to claim 1, wherein said rare-earth element doped fiber is an erbium doped fiber which has been doped with erbium.

7. An optical amplifier according to claim 6, wherein with said optical filter, said predetermined spectral spacing is set to a value centered on 24 nm and said maximum loss wavelength is set to a value centered on 1558 nm, and said wavelength division multiplexed signal light includes signal light of sixteen waves with a wavelength spacing of 0.8 nm.

8. An optical amplifier according to claim 6, wherein with said optical filter, said predetermined spectral spacing is set to a value centered on 24 nm, and said maximum loss wavelength is set to a value centered on 1558 nm, and said wavelength division multiplexed signal light includes signal light of eight waves with a wavelength spacing of 1.6 nm.

9. An optical amplifier according to claim 6, wherein with said optical filter, said predetermined spectral spacing is set to a value centered on 12 nm and said maximum loss wavelength is set to a value centered on 1558 nm, and said wavelength division multiplexed signal light includes signal light of eight waves with a wavelength spacing of 0.8 nm.

10. A wavelength division multiplexed light transmission system comprising;
    light transmitting means for transmitting wavelength division multiplexed signal light which includes a plurality of signal lights of different wavelengths to an optical transmission path,
    a plurality of optical amplifiers for batch amplifying wavelength division multiplexed signal light propagating along said optical transmission path, and
    light receiving means for receiving wavelength division multiplexed signal light transmitted via said transmission path, wherein
    at least one optical amplifier of said plurality of optical amplifiers comprises;
    a rare-earth element doped fiber doped with a rare-earth element, an excitation light source for generating excitation light for exciting said rare-earth element doped fiber, a multiplexing section which inputs the excitation light generated by said excitation light source to said rare-earth element doped fiber, and an optical filter which has a loss-wavelength characteristic that periodically changes at a predetermined spectral spacing based on a wavelength difference between adjacent gain peaks in a gain-wavelength characteristic of said rare-earth element doped fiber, with a maximum loss wavelength in said loss wavelength characteristic being approximately coincident with one of the gain peak wavelengths where said plurality of signal lights of different wavelengths are positioned and the other of said adjacent gain peaks corresponds to a wavelength band in which noise light is generated.

11. An apparatus comprising:

an optical filter having a loss-wavelength characteristic that periodically changes at a predetermined spectral spacing based on a wavelength difference between adjacent gain peaks in a gain-wavelength characteristic of a rare-earth element doped fiber, with a maximum loss wavelength in said loss wavelength characteristic being approximately coincident with one of the gain peak wavelengths where a plurality of signal lights of different wavelengths are positioned and the other of said adjacent gain peaks corresponds to a wavelength band in which noise light is generated.

* * * * *